Aug. 9, 1949. A. H. REDDING 2,478,206
MULTIROTOR GAS TURBINE POWER PLANT WITH PROPELLER
Filed Feb. 24, 1944 3 Sheets-Sheet 1
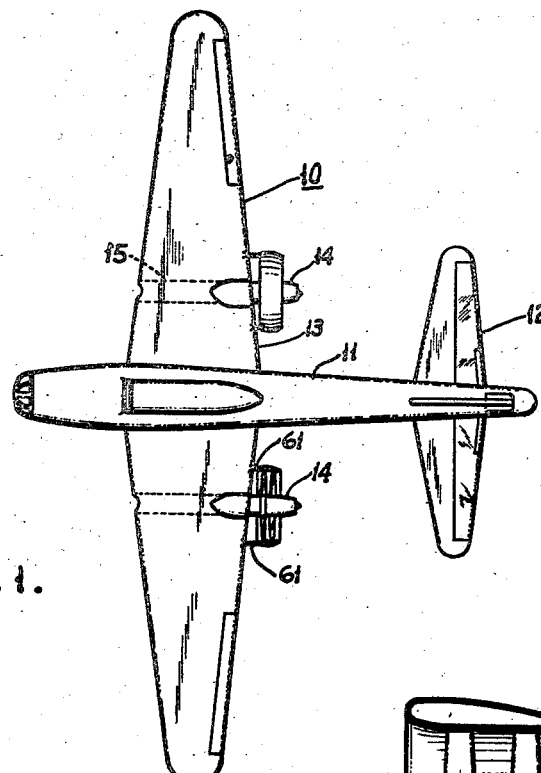
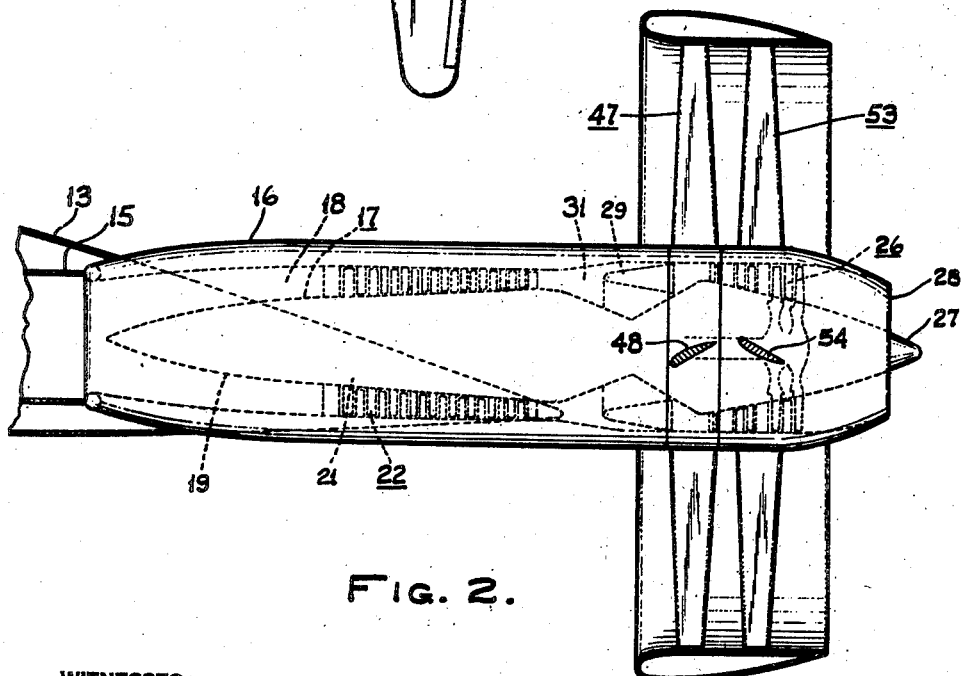
WITNESSES:
INVENTOR
ARNOLD H. REDDING.
BY
ATTORNEY Aug. 9, 1949.  A. H. REDDING  2,478,206
MULTIROTOR GAS TURBINE POWER PLANT WITH PROPELLER
Filed Feb. 24, 1944  3 Sheets-Sheet 3

WITNESSES:

INVENTOR
ARNOLD H. REDDING.
BY
ATTORNEY

Patented Aug. 9, 1949

2,478,206

UNITED STATES PATENT OFFICE 2,478,206

MULTIROTOR GAS TURBINE POWER PLANT WITH PROPELLER

Arnold H. Redding, Swarthmore, Pa., assignor to Westinghouse Electric Corporation, East Pittsburgh, Pa., a corporation of Pennsylvania Application February 24, 1944, Serial No. 523,715

8 Claims. (Cl. 60—35.6)

This invention relates to power plants for aircraft and particularly to a plant comprising a gas turbine having several independent and oppositely rotating rotors and it has for an object to provide an improved device of the character set forth.

While not limited thereto the present invention is particularly applicable to gas turbine power plants such as used for the propulsion of aircraft. When so used one or more airplane propellers as well as a compressor which compresses the motive fluid for the turbine are directly driven by a respective rotor of the turbine. The blading of the rotors is arranged to apportion the power extracted by each rotor in a predetermined ratio.

Ordinarily, large amounts of power cannot be extracted efficiently from a small number of stages of a turbine where the peripheral velocities of the rotors are low; however, by having a high peripheral speed rotor follow one or more low speed rotors, and especially when they rotate in opposite directions, it is possible to extract large amounts of power in the low-speed rotor or rotors and use the large tangential velocities, which would otherwise be wasted, in the high speed rotor.

This arrangement is used to advantage in the present invention in that it permits airplane propellers to be directly connected to the low speed rotors and an efficient high-speed compressor to be directly connected to the high-speed rotor.

The thrust of the propellers driving the airplane is augmented by discharging the motive fluid, leaving the multi-rotor turbine, as a jet through a nozzle and thereby further increasing the overall efficiency of the power plant.

It has been proposed to propel aircraft at extremely high speeds by the employment of a jet motor in which air is compressed and heated by combustion of fuel supported by the compressed air. The resulting motive fluid comprising the products of combustion and the excess compressed air is discharged through a propulsion nozzle as a jet, the reaction of which serves to drive the aircraft at a high rate of speed. It has also been proposed to compress the air by means of a compressor driven by a turbine rotor disposed in the path of the motive fluid and which extracts a portion of the energy in the motive fluid. While plants of the type mentioned are capable of propelling aircraft at high speeds, their rate of fuel consumption is extremely high and their thermal efficiency is good only when operating at maximum thrust. The result is that aircraft powered by plants of this type have a very short cruising range as compared to aircraft driven by internal combustion engine driven propellers.

It is an object of the present invention to improve the efficiency of a gas turbine power plant and increase the cruising range of the aircraft by employing a multi-rotor turbine which in addition to extracting power from the hot motive fluid for driving the air compressor also extracts power from the motive fluid for driving the propellers of the airplane.

It is also an object of the present invention to employ axially-aligned oppositely rotating propellers operating in a duct and at speeds substantially greater than speeds at which propellers of comparable power now in common use operate.

These and other objects are effected by the invention as will be apparent from the following description and claims taken in connection with the accompanying drawing, forming a part of this application, in which:

Fig. 1 is a diagrammatic plan view of an airplane in which two power plants made in accordance with the present invention have been mounted, one of the ducts surrounding the airplane propellers being broken away;

Fig. 2 is an enlarged side elevational view of one of the plants shown in Fig. 1, the wing and duct surrounding the propellers being broken away for the sake of clarity;

Figure 3:
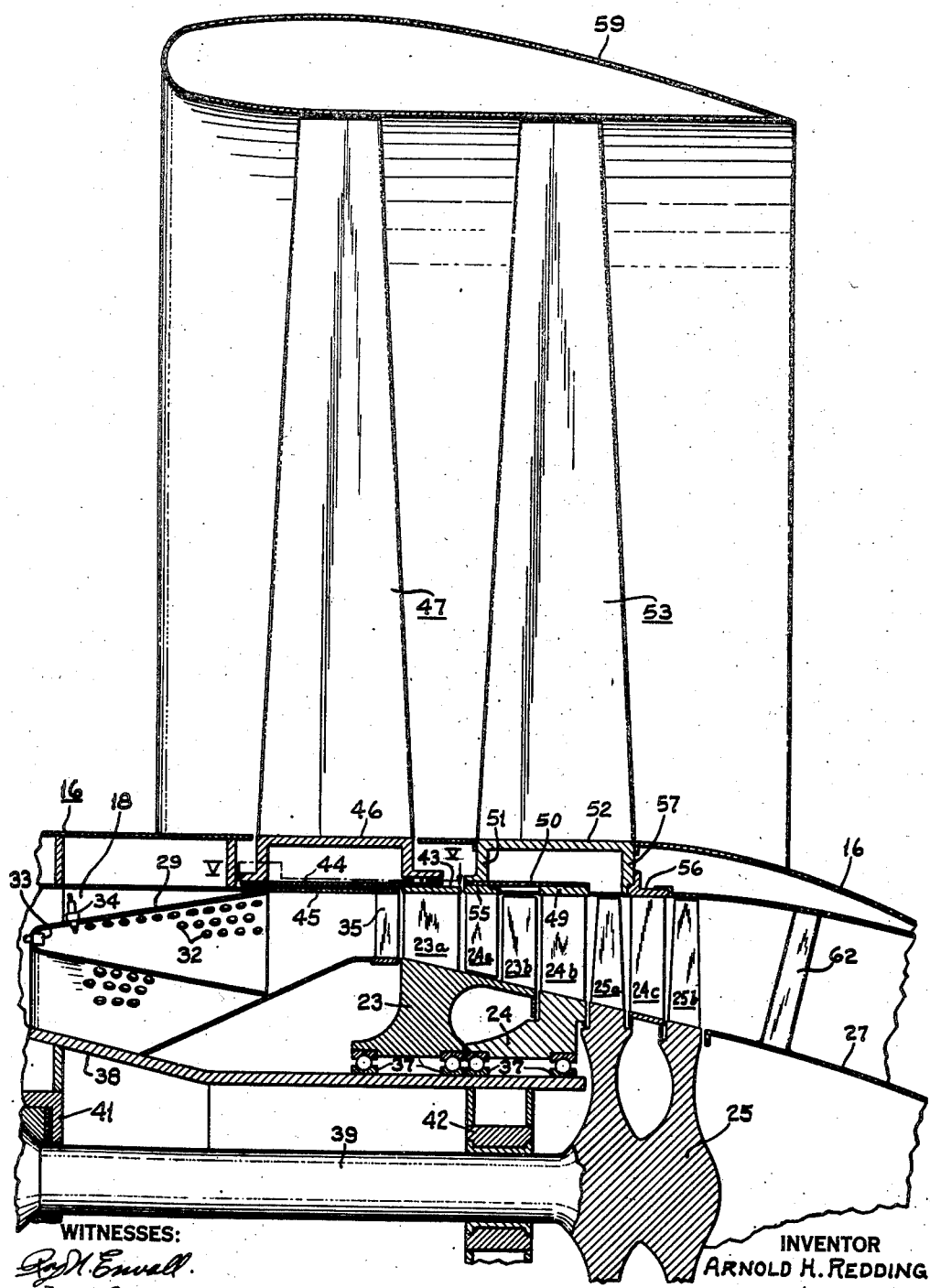
Fig. 3 is an enlarged vertical sectional view of the rear portion of the plant shown in Figs. 1 and 2.

The airplane, generally indicated 10, shown diagrammatically in Fig. 1 may be of conventional design including a fuselage 11, tail structure 12 and a wing 13. In the embodiment shown, two power plants 14, made in accordance with the present invention, are mounted in the wing of the airplane. The power plants are preferably of the open duct type and extend into the wing from the trailing edge with the inlet of each communicating with a tunnel or duct 15 formed in the wing and which opens to the leading edge of the wing, for admitting air to the plants.

The power plants 14 are identical and a description of one will suffice. Each plant comprises in general an outer shell or casing structure 16 open from end to end and a central core structure 17 providing an annular flow passage 18 extending fore and aft with respect to the airplane.

The central core structure 17 is supported by the casing structure along its longitudinal axis and includes a front fairing cone 19 in which fuel and lubricating oil pumps and ignition apparatus (not shown) may be supported. The core structure also includes a rotor 21 of an axial flow compressor 22, rotors 23, 24 and 25 of a turbine, generally indicated 26, and a conical tail piece 27 which defines with the rear or outlet end of the casing an annular propulsion nozzle 28. An annular combustion chamber 29 is mounted within the casing between the compressor and the turbine for heating the compressed air before it enters the turbine.

The present invention is not concerned with the specific design of the compressor and combustion apparatus although a preferred form of compressor is shown in my copending application Serial No. 503,930, filed September 27, 1943, now Patent No. 2,446,552, and preferred combustion apparatus is shown in the copending application of Stewart Way et al., Serial No. 511,468, filed November 23, 1943, each application being assigned to the assignee of the present invention.

In general, the power plant operates as follows: Air enters the compressor 22 through the duct 15 and is compressed. On leaving the compressor, the air enters an annular diffuser passage 31 which effects a further compression of the air. The air then passes through numerous openings 32 provided in the annular combustion chamber which is of conical or triangular section, as shown in Fig. 3. In this chamber, the compressed air is mixed with fuel supplied under pressure to a row of atomizing nozzles 33 providing continuous combustion after being ignited by any suitable means such as one or more spark plugs 34. The hot motive fluid, comprising the products of combustion and excess air heated by the combustion, on leaving the combustion chamber is directed by nozzle forming guide vanes 35 into the divergent blade passage of the multi-rotation turbine 26. The spent gases leaving the turbine are discharged through the propulsion nozzle 28 at a high velocity so that the energy remaining in the motive fluid is used to propel the aircraft.

The tailpiece 27 of the propulsion nozzle may, if desired, be made longitudinally movable with respect to the outer casing as shown for example in the patent of Donald Bradbury, No. 2,402,363, granted June 18, 1946, to the assignee of the present invention, to increase or decrease the flow area of the propulsion nozzle and thereby vary the jet effect and to change the back pressure of the turbine.

The turbine 26 comprises two low speed rotors 23 and 24 which are adapted to rotate in opposite directions and at substantially the same speed and a high speed rotor 25. Although not limited thereto, in the particular embodiment shown, the low speed rotors 23 and 24 may rotate at about 1800 R. P. M. and the high speed rotor 25 may rotate at about 13,000 R. P. M. at maximum thrust.

The low speed rotors 23 and 24 are supported by means of suitable bearings 37 on an inner tubular wall structure 38 carried by the outer casing structure 16 and defining therewith an intermediate portion of the flow passage 18. The high speed rotor 25 is connected by a shaft 39 to the rotor 21 of compressor 22. The shaft 39 is journaled in suitable bearings shown diagrammatically at 41 and 42, which may be carried by the inner wall structure 38.

The low speed rotor 23 carries two rows of blades 23a and 23b. The row of blades 23a is provided with a shroud ring 43, to which is secured a plurality of forwardly extending relatively thin flexible metal strips 44 which are closely spaced and disposed outside of a wall 45 of the casing structure 16. The free ends of the strips 44 are secured to one flange of an annular rigid ring 46 preferably of channel section, forming the hub of a propeller 47.

The propeller 47 may comprise any desired number of blades 48 of airfoil section, as shown in Fig. 2, and it is preferred that the propeller have a solidity of the order of 25% or more so that it will handle full power, as at takeoff, without stalling.

Suitable known sealing means may be employed throughout the turbine, as between the strips 44 and the wall 45 to prevent leakage of motive fluid from the turbine 26 to the atmosphere.

The low speed rotor 24 is driven by three rows of blades identified 24a, 24b and 24c. The central row of blades 24b have their roots secured to the rotor in any suitable manner while their tips are secured to a shroud ring 49. The shroud ring 49 has secured thereto a plurality of closely spaced flexible strips 50, similar to the strips 44. The forward ends of the strips 50 are in turn secured to a flange 51 of a hub 52 of a second propeller 53 comprising airfoil blades 54. The blades 48 and 54 of the propellers 47 and 53, respectively, are of opposite pitch and rotated in opposite directions by the oppositely rotating rotors 23 and 24.

The first row of blades 24a of the rotor 24 is disposed between the blades 23a and 23b and is carried by a shroud ring 55 which is secured to the free end of the strips 50 and the hub flange 51. The third row of blades 24c of the rotor 24 are carried by a shroud ring 56 which is in turn secured to a flange 57 of the rear propeller hub 52.

By employing laterally flexible strips 44 and 50 for connecting the propeller hubs 46 and 52 to the rotors 23 and 24, respectively, each row of turbine blades is free to expand or contract due to temperature changes without stressing the propeller structure while at the same time providing a structurally rigid assembly.

The high speed rotor 25 carries two rows of blades 25a and 25b and this rotor rotates in a direction opposite to that of the rotor 24 with the row of blades 25a disposed between the row of blades 24b and 24c of the low speed rotor 24.

In the particular embodiment shown, the propellers 47 and 53 have an over-all diameter, from tip to tip of diametrically opposed blades, of about 8 feet and are designed to rotate at about 1800 R. P. M. which is substantially greater than the conventional airplane propeller. The propeller blades 48 and 54 are of airfoil section and operate efficiently at this high speed within a duct ring 59 of streamline cross section, as shown in Fig. 3. The duct ring 59 is supported from the wing 13 by suitable brackets 61 extending rearwardly from the trailing edge of the airplane wing.

The portion of the casing 16 extending rearwardly from the propeller hub 52 may be secured to and rotate with this hub, suitable struts 62 being provided for supporting the tailpiece 27 from this portion of the casing. The struts 62 are of streamlined section and disposed at a suitable angle to the direction of flow through the propulsion nozzle so that they offer a minimum of resistance to the flow.

The turbine blading is designed so that the compressor is driven at a much higher speed than the propellers, that a balanced torque relation is maintained, and that the work outputs for the blade rows are of the same order as the heat drops thereover. The balanced torque relation is secured by having torques of the nozzles and the blades 24a, 24b and 24c in balanced relation with respect to the blades 23a, 23b, and 25a and 25b.

Figure 4:
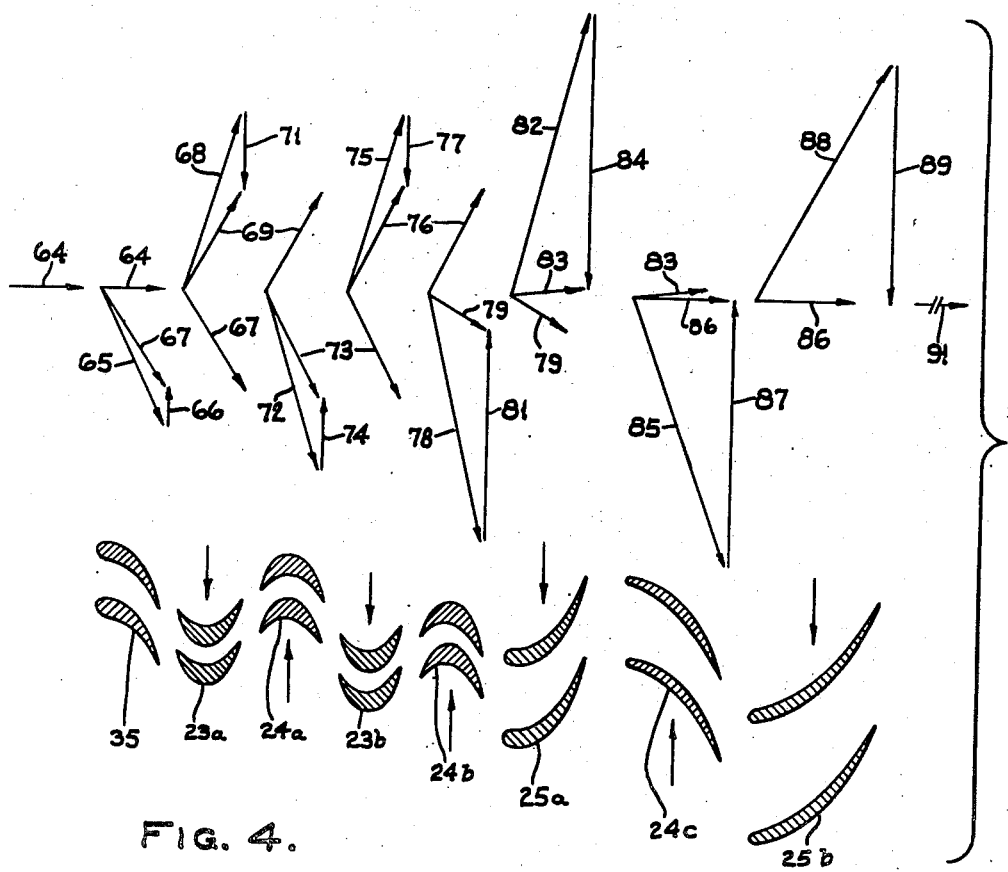
Fig. 4 is a vector diagram illustrating the turbine blade and motive fluid velocities.
Figure 5:
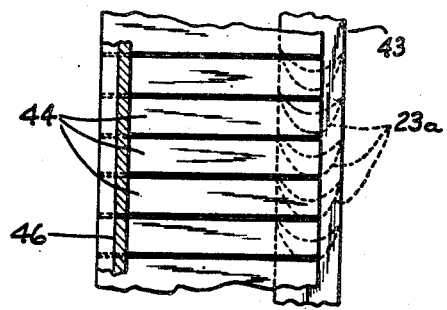
Fig. 5 is a developed plan view taken substantially on the line V—V of Fig. 3.

In Fig. 4, there is shown a velocity vector diagram together with a diagrammatic illustration showing a preferred shape and angular disposition of a pair of blades of each blade row of the turbine. The motive fluid leaving the combustion chamber and entering the nozzles formed by guide vanes 35 is represented by vector 64 and is shown as substantially axial of the turbine in direction. The motive fluid is turned by the guide vanes 35 so that it has velocity in direction and amount, on leaving the nozzles, represented by the vector 65. The vector 66 represents the velocity of the first row of moving blades 23a so that the relative velocity of the motive fluid entering the blades 23a is represented by the vector 67.

The motive fluid in flowing through the passages between the blades 23a is turned by these blades so that it has a velocity, leaving and relative to these blades, represented by the vector 68. The velocity of the motive fluid at this instant, relative to the second row of blades 24a of the rotor 24, which rotates in a direction opposite to the rotor 23, is represented by the vector 69 since the velocities of the rotors 23 and 24 are additive as represented by the vector 71.

As the motive fluid passages through the blade row 24a, it is turned so that its leaving velocity is represented by the vector 72. The velocity of the motive fluid relative to the third row of blades 23b is represented by the vector 73 since again the velocities of the rows 23a and 23b are additive as represented by the vector 74.

The velocity of the motive fluid in passing through the succeeding stages of the turbine is determined in a manner similar to that described above so that the motive fluid in passing through the third row of blades 23b is turned and its leaving velocity is represented by the vector 75, resulting in a velocity represented by the vector 76 relative to the succeeding stage 24b. The vector 77 represents the combined velocities of the blade rows 23b and 24b.

The motive fluid entering the blade row 24b has a velocity represented by the vector 76 and is turned in passing through this stage so that it has a leaving velocity represented by the vector 78. The velocity of the motive fluid relative to the succeeding high speed blade row 25a is represented by the vector 79, the vector 81 representing the sum of the velocities of the low speed blade row 24b and the high speed blade row 25a.

In passing through the high speed blade row 25a the motive fluid is turned so that its velocity on leaving this row is represented by the vector 82 and its velocity relative to the succeeding low speed blade row 24c is represented by the vector 83 since the velocities of the blade row 25a and 24c are added as represented by the vector 84 since the adjacent blade rows rotate in opposite directions.

In passing through the low speed blade row 24c the motive fluid is turned so that its velocity on leaving and relative to this row is represented by the vector 85, the velocity relative to the final blade row 25b being represented by the vector 86. The vector 87 represents the combined velocities of the blade rows 24c and 25b.

In passing through the final blade row 25b the motive fluid is turned so that its relative velocity on leaving this row is represented by the vector 88. The vector 89 represents the blade velocity of the final blade row 25b so that the velocity of the motive fluid leaving the final row and relative to the casing 16 is represented by the vector 91, which, it will be noted is axial or nearly so with the result there is substantially no swirling loss in the motive fluid on leaving the final blade row.

It is desirable that the motive fluid be discharged from the propulsion nozzle 28 substantially axial and this condition is obtained as evidenced by the vector diagram and particularly the direction of the vector 91 which represents the velocity of the motive fluid leaving the turbine 26.

While the invention has been shown in but one form, it will be obvious to those skilled in the are that it is not so limited, but is susceptible of various changes and modifications without departing from the spirit thereof, and it is desired, therefore, that only such limitations shall be placed thereupon as are specifically set forth in the appended claims.

What is claimed is:

1. A gas turbine power plant comprising a casing structure, a core structure mounted coaxially within said casing structure and defining therewith an annular flow passage, said core structure including an axial flow compressor rotor, blading in said passage carried by said casing structure and said rotor, said core structure also including a plurality of turbine rotors downstream of said compressor rotor, blading in said passage and carried by said turbine rotors, with the blading of the respective rotors arranged so that said rotors rotate in opposite directions, means in said passage for heating the compressed air flowing from said compressor to said turbine blades, a propeller concentric with and axially overlapping one of said turbine rotors, means connecting said propeller to the tips of the blades of said one turbine rotor, and means connecting the other of said turbine rotors to said compressor rotor.

2. A gas turbine power plant comprising a casing structure, a core structure mounted coaxially within said casing structure and defining therewith an annular flow passage, said core structure including an axial flow compressor rotor, blading in said passage carried by said casing structure and said rotor, said core structure also including a plurality of turbine rotors downstream of said compressor rotor, blading in said passage and carried by said turbine rotors, with the blading of the respective rotors arranged so that said rotors rotate in opposite directions, means in said passage for heating the compressed air flowing from said compressor to said turbine blades, a propeller concentric with said turbine rotors, means connecting said propeller to the tips of the blades of one of said turbine rotors, and means connecting the other said turbine rotors to said compressor rotor, the said means connecting the propeller and the tips of the blades being arranged to permit expansion and contraction of said blades.

3. A gas turbine power plant comprising a casing structure, a core structure mounted coaxially within said casing structure and defining therewith an annular flow passage, said core structure including an axial flow compressor rotor, blading in said passage carried by said casing structure and said rotor, said core structure also including a plurality of turbine rotors downstream of said compressor rotor, blading in said passage and carried by said turbine rotors, with the blading of the respective rotors arranged so that said rotors rotate in opposite directions, means in said passage for heating the compressed air flowing from said compressor to said turbine blades, a propeller concentric with said turbine rotors, means connecting said propeller to the tips of the blades of one of said turbine rotors, and means connecting the other said turbine rotors to said compressor rotor, the rotor connected to the propeller being adapted to rotate at a lower speed than the other rotor and said other rotor being disposed downstream of the first mentioned rotor.

4. A gas turbine power plant comprising a casing structure, a core structure mounted coaxially within said casing structure and defining therewith an annular flow passage, said core structure including an axial flow compressor rotor, blading in said passage carried by said casing structure and said rotor for effecting compression of air, means located downstreams of said blading adapted to heat the air compressed by said compressor, and a turbine disposed downstream of said air heating means, said turbine comprising at least three rotors arranged so that adjacent rotors turn in opposite directions, blading carried by the respective turbine rotors and disposed in said passage, the blading of the respective turbine rotors being arranged so that the turbine rotor at the downstream end of the turbine rotates at a substantially greater speed than the upstream rotors, means connecting said downstream turbine rotor to the compressor rotor for driving the same, a pair of propellers arranged to rotate in opposite directions and substantially concentric with said turbine rotors, means for connecting a propeller of the pair to a respective upstream turbine rotor, said last-mentioned means including flexible means connecting said propellers to the periphery of their respective turbine rotors.

5. A power plant of the character set forth in claim 4 and further including an annular duct concentric to said propellers.

6. A power plant comprising a compressor; a multi-rotor turbine adapted to be driven by fluid compressed by said compressor, said turbine having at least three rotors arranged so that adjacent rotors turn in opposite directions; combustion apparatus adapted to heat the fluid compressed by said compressor prior to its passage through said turbine; a pair of propeller hubs arranged concentric with said turbine rotors; means flexibly connecting the hub of each of said propellers with a respective turbine rotor; and means for transmitting the power developed in the third turbine rotor to the compressor.

7. A power plant comprising a casing structure, a core structure mounted coaxially within said casing structure and defining therewith an annular flow passage, said core structure including an axial flow compressor rotor, blading in said passage carried by said casing structure and said rotor, said core structure also including a plurality of rotors down stream of said compressor rotor, a combustion chamber disposed in the flow path of air from said compressor rotor to said plurality of rotors, blading in said passage and carried by said rotors, at least one of said rotors being adapted to rotate at a speed substantially greater than the other rotor or rotors, means connecting said high speed rotor to said compressor for driving the same, and a propeller carried by and adapted to rotate with one of said low speed rotors, said propeller extending radially outwardly of said casing.

8. In an axial-flow turbine, a stator structure provided with an axially-extending tubular element, first, second and third rotors arranged coaxially with respect to the tubular element with the second rotor extending between the first and third rotors; bearings for supporting the first and second rotors on the tubular element for rotation about the latter; means for supporting the third rotor including a shaft member extending through the tubular element; interleaving rows of blades carried by the rotors and arranged to provide for rotation of the second rotor oppositely to the first and third rotors; a plurality of nozzles carried by the stator structure for supplying elastic fluid for flow through the blade passages of the rows of blades; a pair of driven devices disposed in encompassing relation with respect to the blading; and means utilizing the blading for connecting the driven devices to the first and second rotors.

ARNOLD H. REDDING.

REFERENCES CITED

The following references are of record in the file of this patent:

UNITED STATES PATENTS

| Number | Name | Date |
|---|---|---|
| 760,037 | Stumpf | May 17, 1904 |
| 864,400 | Wing | Aug. 27, 1907 |
| 906,133 | Hedlund | Dec. 8, 1908 |
| 910,036 | Wolfson | Jan. 19, 1909 |
| 996,324 | De Ferranti | June 27, 1911 |
| 1,017,564 | Lake | Feb. 13, 1912 |
| 1,055,308 | Benjamins | Mar. 11, 1913 |
| 1,056,288 | MacIntosh | Mar. 18, 1913 |
| 2,168,726 | Whittle | Aug. 8, 1939 |
| 2,292,288 | Pateras Pescara | Aug. 4, 1942 |
| 2,404,767 | Heppner | July 23, 1946 |
| 2,409,446 | Pavlecka et al. | Oct. 15, 1946 |

FOREIGN PATENTS

| Number | Country | Date |
|---|---|---|
| 50,224 | Denmark | Apr. 29, 1935 |

OTHER REFERENCES

Ser. No. 367,666, Anxionnaz et al. (A. P. C.), pub. May 25, 1943.

Flight, issue of May 13, 1943, pp. 496-498.

Flight, issue of Feb. 17, 1944, page 171.